United States Patent
Kim et al.

(10) Patent No.: US 10,623,151 B2
(45) Date of Patent: Apr. 14, 2020

(54) METHOD FOR PERFORMING COMMUNICATION USING FLEXIBLE FDD FRAME IN WIRELESS COMMUNICATION SYSTEM AND DEVICE THEREFOR

(71) Applicant: LG ELECTRONICS INC., Seoul (KR)

(72) Inventors: Dongkyu Kim, Seoul (KR); Hyunsoo Ko, Seoul (KR); Kwangseok Noh, Seoul (KR); Sangrim Lee, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/754,474

(22) PCT Filed: May 24, 2016

(86) PCT No.: PCT/KR2016/005475
§ 371 (c)(1),
(2) Date: Feb. 22, 2018

(87) PCT Pub. No.: WO2017/034125
PCT Pub. Date: Mar. 2, 2017

(65) Prior Publication Data
US 2018/0248662 A1    Aug. 30, 2018

Related U.S. Application Data

(60) Provisional application No. 62/208,796, filed on Aug. 23, 2015.

(51) Int. Cl.
*H04J 1/00* (2006.01)
*H04L 5/00* (2006.01)
*H04J 11/00* (2006.01)
*H04L 5/14* (2006.01)

(52) U.S. Cl.
CPC ............ *H04L 5/0007* (2013.01); *H04J 11/00* (2013.01); *H04L 5/0044* (2013.01); *H04L 5/143* (2013.01);
(Continued)

(58) Field of Classification Search
USPC ........ 370/329, 280, 229, 276, 281, 330, 336
See application file for complete search history.

(56) References Cited

U.S. PATENT DOCUMENTS

2009/0219875 A1    9/2009   Kwak et al.
2009/0268645 A1    10/2009  Chindapol et al.
(Continued)

FOREIGN PATENT DOCUMENTS

KR    100957414 B1    5/2010

OTHER PUBLICATIONS

Search Report of European Patent Office in Appl'n No. 16839416.1, dated Mar. 22, 2019.
(Continued)

*Primary Examiner* — Phuongchau Ba Nguyen
(74) *Attorney, Agent, or Firm* — Dentons US LLP

(57) ABSTRACT

A method for a terminal performing communication using a flexible frequency division duplex (FDD) frame in a wireless communication system comprises the step of transmitting and receiving a signal using the flexible FDD frame, wherein the flexible FDD frame comprises a downlink band allocated from the wireless communication system as a resource for a downlink, and an uplink band allocated as a resource for an uplink, wherein the uplink band may comprise a downlink sub-band allocated as a resource for the downlink by a base station for the flexible FDD scheme.

14 Claims, 15 Drawing Sheets

(52) U.S. Cl.
CPC .......... *H04L 5/0051* (2013.01); *H04L 5/0055* (2013.01); *H04L 5/0073* (2013.01); *H04L 5/0094* (2013.01); *H04L 5/1461* (2013.01); *H04L 5/1469* (2013.01)

(56) References Cited

U.S. PATENT DOCUMENTS

| | | |
|---|---|---|
| 2011/0019597 A1 | 1/2011 | Moon et al. |
| 2012/0020299 A1* | 1/2012 | Chun .................... H04L 1/1607 370/328 |
| 2013/0242824 A1 | 9/2013 | Lee et al. |
| 2014/0022966 A1 | 1/2014 | Parkvall et al. |
| 2014/0301319 A1* | 10/2014 | Aiba .................... H04L 1/0026 370/329 |
| 2015/0109932 A1 | 4/2015 | Goldhamer |
| 2015/0365197 A1* | 12/2015 | Nakao .................. H04L 1/1607 714/748 |
| 2016/0057746 A1* | 2/2016 | Drucker ............... H04B 7/2615 370/280 |
| 2017/0048039 A1* | 2/2017 | Zhao ..................... H04L 5/0048 |
| 2017/0265207 A1* | 9/2017 | Takeda ................. H04W 28/04 |
| 2018/0019859 A1* | 1/2018 | Cheng ................. H04W 72/044 |

OTHER PUBLICATIONS

LG Electronics, et al.: "Further discussion on regulatory aspects related to flexible duplex operation for E-UTRAN", RP-150250, 3GPP TSG RAN Meeting #67, Shanghai, China, Mar. 9-12, 2015.

* cited by examiner (a)

(b)

FIG. 16a
FIG. 16b
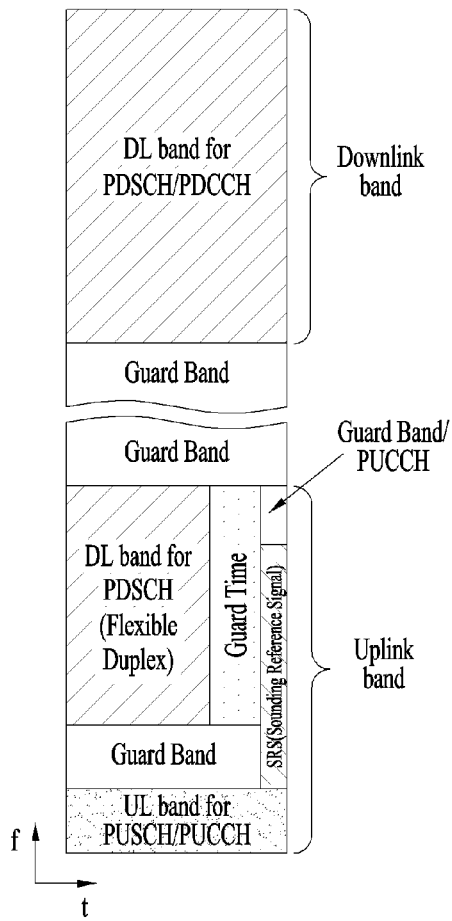
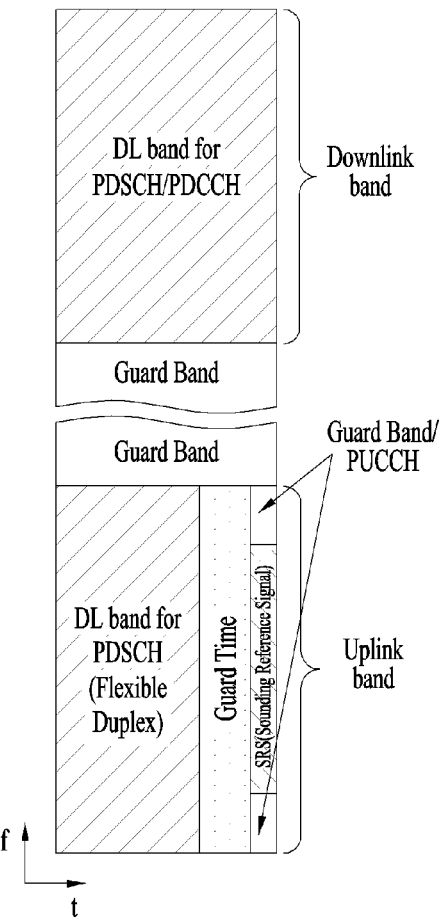

METHOD FOR PERFORMING COMMUNICATION USING FLEXIBLE FDD FRAME IN WIRELESS COMMUNICATION SYSTEM AND DEVICE THEREFOR

This application is a 35 USC § 371 National Stage entry of International Application No. PCT/KR2016/005475, filed on May 24, 2016, and claims priority to U.S. Provisional Application No. 62/208,796, filed on Aug. 23, 2015, all of which are incorporated by reference in their entirety herein.

TECHNICAL FIELD

The present invention relates to wireless communication, and more particularly, to a method for performing communication using a flexible FDD frame in a wireless communication system and apparatus therefor.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS

DISCLOSURE OF THE INVENTION

Technical Task

The first object of the present invention is to provide a method performed by a UE for performing communication using a flexible FDD frame in a wireless communication system.

The second object of the present invention is to provide a UE for performing communication using a flexible FDD frame in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To achieve the first object of the present invention, provided herein is a method for performing communication using a flexible frequency division duplex (FDD) frame by a user equipment (UE) in a wireless communication system, including tranceving signals using the flexible FDD frame, wherein the flexible FDD frame may include a downlink band allocated as a resource for downlink and an uplink band allocated as a resource for uplink by the wireless communication system, and wherein the uplink band may include a downlink subband allocated as a resource for downlink by a base station (BS) for a flexible FDD scheme. The uplink band may further include an uplink subband and a guard band. The uplink band of the flexible FDD frame may include at least one subframe for a downlink transmission, at least one subframe for an uplink transmission, and a guard time. The uplink band may further include an uplink subband, a guard band, and a guard time. The uplink band may further include a resource for transmitting a sounding reference signal (SRS).

To achieve the second object of the present invention, provided herein is a user equipment (UE) for performing communication using a flexible frequency division duplex (FDD) frame in a wireless communication system, including: a radio frequency (RF) unit; and a processor configured to control the RF unit to transceive a signal using the flexible FDD frame, wherein the flexible FDD frame may include a downlink band allocated as a resource for downlink and an uplink band allocated as a resource for uplink by the wireless communication system, and wherein the uplink band may include a downlink subband allocated as a resource for downlink by a base station (BS) for a flexible FDD scheme. The uplink band may further include an uplink subband and a guard band. The uplink band of the flexible FDD frame may include at least one subframe for a downlink transmission, at least one subframe for an uplink transmission, and a guard time. The uplink band may further include an uplink subband, a guard band, and a guard time. The uplink band may further include a resource for transmitting a sounding reference signal (SRS).

Advantageous Effects

According to the present invention, it is possible to eliminate inefficient use of resources resulting from asymmetrical data traffic of the conventional FDD scheme, thereby improving communication efficiency.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 16a and 16b are diagrams respectively illustrating examples in which the last UL symbol is allocated for SRS transmission according to embodiments 1 and 2.

BEST MODE FOR INVENTION

Figure 1:
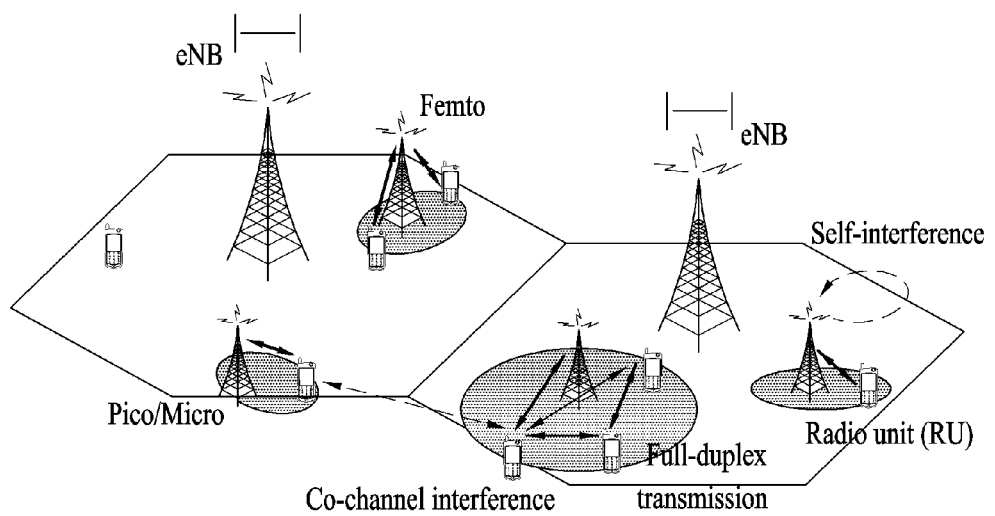
FIG. 1 is a diagram illustrating an exemplary network supporting full-duplex/half-duplex communication operation schemes for a UE proposed in the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
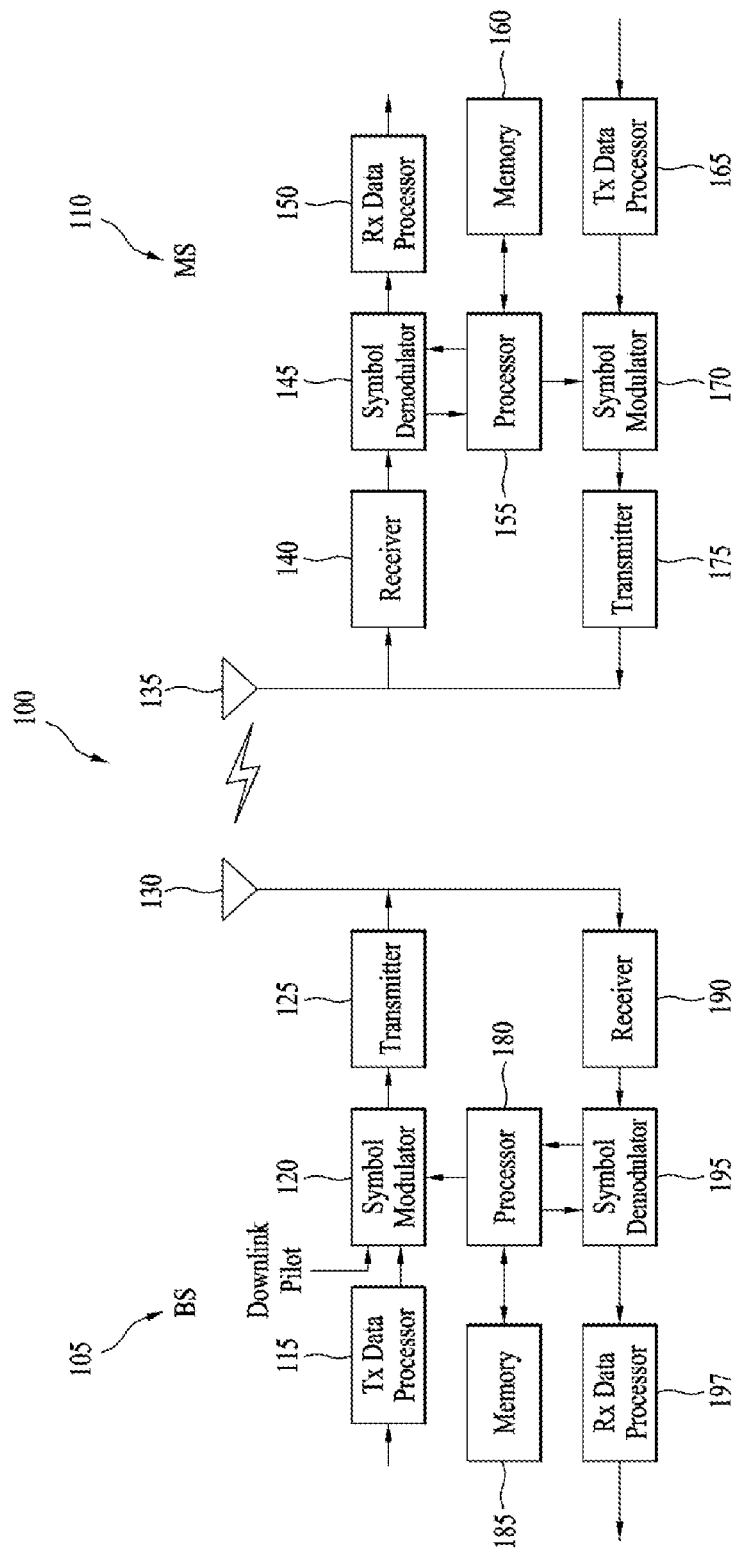
FIG. 2 is a block diagram for configurations of a base station (BS) 105 and a user equipment (UE) 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
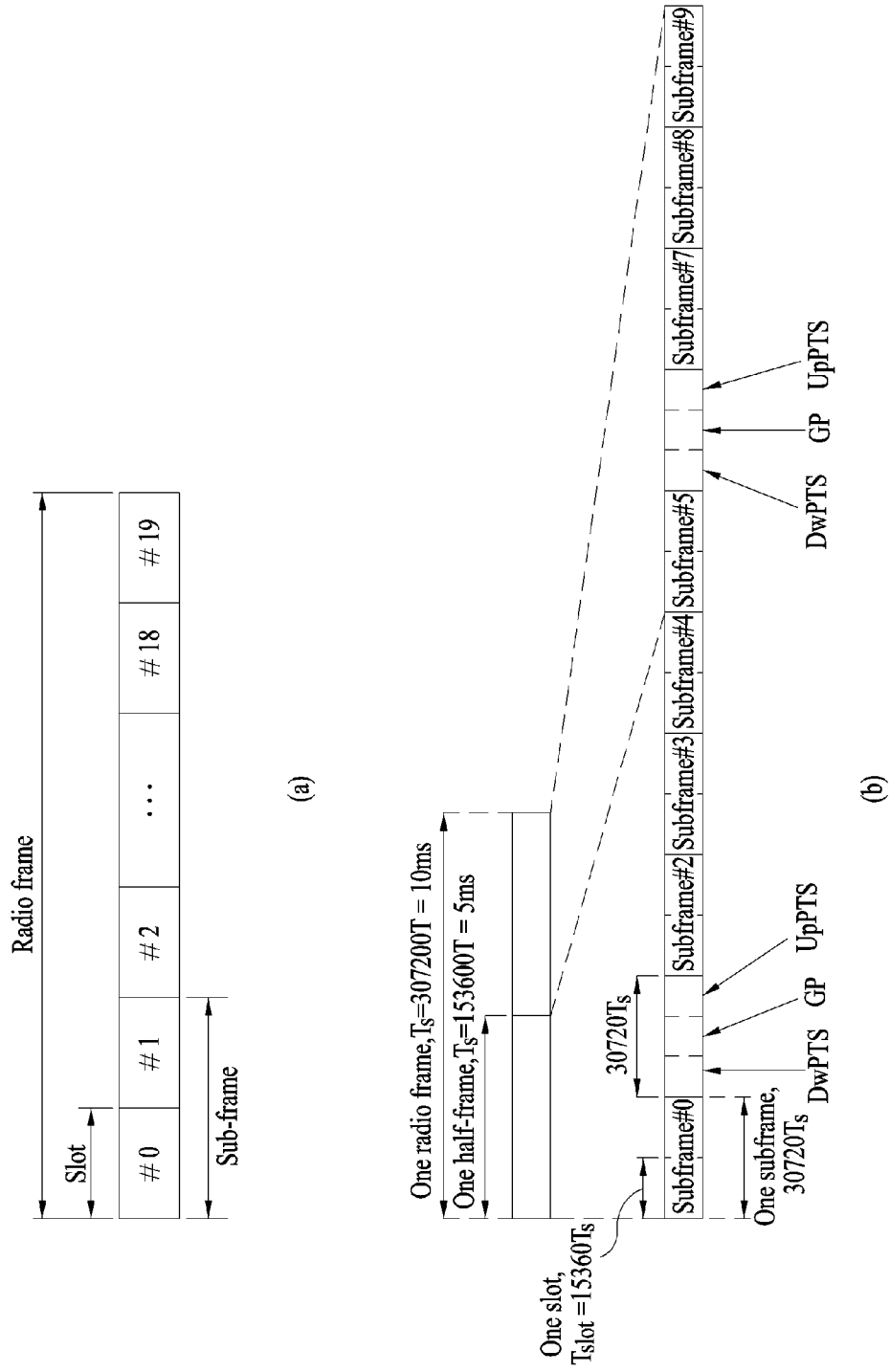
FIG. 3 is a diagram showing the structure of a radio frame used in a 3GPP LTE/LTE-A system which is an example of a wireless communication system

FIG. 3 is a diagram showing the structure of a radio frame used in a 3GPP LTE/LTE-A system which is an example of a wireless communication system.

As a general wireless transmission method, for wireless transmission between a base station and a wireless user equipment (UE) as wireless devices, transmission from the base station to the wireless UE is referred to as downlink transmission and transmission from the wireless UE to the base station is referred to as uplink transmission. A scheme for dividing radio resources between downlink transmission and uplink transmission is defined as "duplex". Bidirectional transmission and reception in a state of dividing a frequency band into a downlink transmission band and an uplink transmission band is referred to as frequency division duplex (FDD) and transmission and reception in a state of dividing a time-domain radio resources into downlink time duration resources and uplink time duration resources in the same frequency band is referred to as time division duplex (TDD).

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 3(a) illustrates the type-1 radio frame structure. A downlink radio frame is divided into ten subframes. Each subframe includes two slots in the time domain. The time required to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first three OFDM symbols of each subframe may be allocated to a physical downlink control channel (PDCCH) and the other OFDM symbols may be allocated to a physical downlink shared channel (PDSCH).

FIG. 3(b) illustrates the type-2 radio frame structure.

The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in a base station and UL transmission synchronization in a UE. The GP is provided to cancel interference generated on UL due to multipath delay of a DL signal between DL and UL.

Each half frame includes 5 subframes, a subframe "D" is a subframe for downlink transmission, a subframe "U" is a subframe for uplink transmission, and a subframe "S" is a special subframe including a DwPTS (Downlink Pilot Time Slot), a guard period (GP) and a UpPTS (Uplink Pilot Time Slot). The DwPTS is used for initial cell search, synchronization, or channel estimation in a UE, whereas the UpPTS is used for channel estimation in a base station and UL transmission synchronization in a UE. The GP is provided to cancel interference generated in UL due to multipath delay of a DL signal between DL and UL.

The special subframe S is present in each half frame in the case of a 5-ms downlink-uplink switch-point period and is present only in a first half frame in the case of a 5-ms downlink-uplink switch-point period. Subframe indices 0 and 5 and DwPTS are used for only downlink transmission. A subframe immediately after the UpPTS and the special subframe is always used for uplink transmission. If multiple cells are aggregated, the UE may assume the same uplink-downlink configuration over all cells and the GPs of the special subframes in different cells overlap by at least 1456 Ts. The radio frame structures are merely examples, and various modifications may be made to the number of subframes included in a radio frame, the number of slots included in a subframe, or the number of symbols included in a slot.

[Table 1] below shows the configuration of the special frames (length of DwPTS/GP/UpPTS).

TABLE 1

| | | Normal cyclic prefix in downlink | | Extended cyclic prefix in downlink | | |
| | | UpPTS | | | UpPTS | |
| Special | | Normal | Extended | | | |
| subframe | | cyclic prefix | cyclic prefix | | Normal cyclic | Extended cyclic |
| configuration | DwPTS | in uplink | in uplink | DwPTS | prefix in uplink | prefix in uplink |
|---|---|---|---|---|---|---|
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

[Table 2] below shows an uplink-downlink configuration in type-2 frame structure in a 3GPP LTE system.

TABLE 2

| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to [Table 2], in the 3GPP LTE system, there are seven uplink-downlink configurations in the type-2 frame structure. The location or number of downlink subframes, special frames or uplink subframes may be changed according to configuration. Various embodiments of the present invention will hereinafter be described centering upon UL-DL configurations of a Type-2 frame structure shown in Table 2. The following Table 3 illustrates k values of TDD configurations 0~6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | | 7 | 4 | | | | 7 | 4 | |
| 1 | | | 4 | | 6 | | | 4 | | 6 |
| 2 | | | 6 | | | | | 6 | | |
| 3 | | | 6 | | | | | | 6 | 6 |
| 4 | | | | | | | | | 6 | 6 |
| 5 | | | | | | | | | 6 | |
| 6 | | | 6 | 4 | | | | 7 | 4 | 6 |

HARQ-ACK received over a PHICH allocated to a UE at the subframe (i) in a Type-1 frame structure may be associated with PUSCH transmission at the subframe (i-4). In Type-2 frame structure UL/DL configurations 1~6, HARQ-ACK received over a PHICH allocated to the UE at the subframe (i) may be associated with PUSCH transmission at the subframe i-k (where k is shown in Table 3).

A UE HARQ-ACK procedure for use in the 3GPP LTE/LTE-A system will hereinafter be described. The present invention will be disclosed centering upon the UE HARQ-ACK procedure for use in the 3GPP LTE/LTE-A system.

TABLE 4

For Frame Structure type 2 UL/DL configuration 1-6, an HARQ-ACK received on the PHICH assigned to a UE in subframe i is associated with the PUSCH transmission in the subframe i-k as indicated by the table 3.
For Frame Structure type 2 UL/DL configuration 0, an HARQ-ACK received on the PHICH in the resource corresponding to $I_{PHICH}$ = 0, assigned to a UE in subframe i is associated with the PUSCH transmission in the subframe i-k as indicated by the table 3.
If, for Frame Structure type 2 UL/DL configuration 0, an HARQ-ACK received on the PHICH in the resource corresponding to $I_{PHICH}$ = 1, assigned to a UE in subframe i is associated with the PUSCH transmission in the subframe i-6.
The physical layer in the UE shall deliver indications to the higher layers as follows:
For downlink subframe i, if a transport block was transmitted in the associated PUSCH subframe then:
if ACK is decoded on the PHICH corresponding to the transport block in subframe i, ACK for that transport block shall be delivered to the higher layers;
else NACK for that transport block shall be delivered to the higher layers.
For downlink subframe i, in case of a retransmission in the associated PUSCH subframe, if a transport block was disabled in the associated PUSCH subframe then ACK for that transport block shall be delivered to the higher layers.

The PHICH assignment procedure for use in the 3GPP LTE/LTE-A system will hereinafter be described. The present invention will be disclosed centering upon the PHICH assignment procedure for use in the 3GPP LTE/LTE-A system.

TABLE 5

For PUSCH transmissions scheduled from serving cell in subframe n, a UE shall determine the corresponding PHICH resource of serving cell c in subframe n + $k_{PHICH}$, where $k_{PHICH}$ is always 4 for FDD and is given in following table 6 for TDD. For subframe bundling operation, the corresponding PHICH resource is associated with the last subframe in the bundle.
The PHICH resource is identified by the index pair ($n_{PHICH}^{group}$, $n_{PHICH}^{seq}$) where $n_{PHICH}^{group}$ is the PHICH group number and $n_{PHICH}^{seq}$ is the orthogonal sequence index within the group as defined by:
$n_{PHICH}^{group} = (I_{PRB\_RA} + n_{DMRS}) \bmod N_{PHICH}^{group} + I_{PHICH} N_{PHICH}^{group}$
$n_{PHICH}^{seq} = (\lfloor I_{PRB\_RA}/N_{PHICH}^{group} \rfloor + n_{DMRS}) \bmod 2N_{SF}^{PHICH}$
where
$n_{DMRS}$ is mapped from the cyclic shift for DMRS field (according to following table 6) in the most recent PDCCH with uplink DCI format [4] for the transport block(s) associated with the corresponding PUSCH transmission. $n_{DMRS}$ shall be set to zero, if there is no PDCCH with uplink DCI format for the same transport block, and
if the initial PUSCH for the same transport block is semi-persistently scheduled, or
if the initial PUSCH for the same transport block is scheduled by the random access response grant.
$N_{SF}^{PHICH}$ is the spreading factor size used for PHICH modulation as described in section 6.9.1 in [3].

$$I_{PRB\_RA} = \begin{cases} I_{PRB\_RA}^{lowest\_index} & \text{for the first TB of a PUSCH with associated PDCCH or for the case of no associated PDCCH when the number of negatively acknowledged TBs is not equal to the number of TBs indicated in the most recent PDCCH associated with the corresponding PUSCH} \\ I_{PRB\_RA}^{lowest\_index} + 1 & \text{for a second TB of a PUSCH with associated PDCCH} \end{cases}$$

where $I_{PRB\_RA}^{lowest\_index}$ is the lowest PRB index in the first slot of the corresponding PUSCH transmission
$N_{PHICH}^{group}$ is the number of PHICH groups configured by higher layers as described in section 6.9 of [3], $$I_{PHICH} = \begin{cases} 1 & \text{for TDD UL/DL configuration 0 with PUSCH transmission in subframe n = 4 or 9} \\ 0 & \text{otherwise} \end{cases}$$

TABLE 6

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Figure 4:
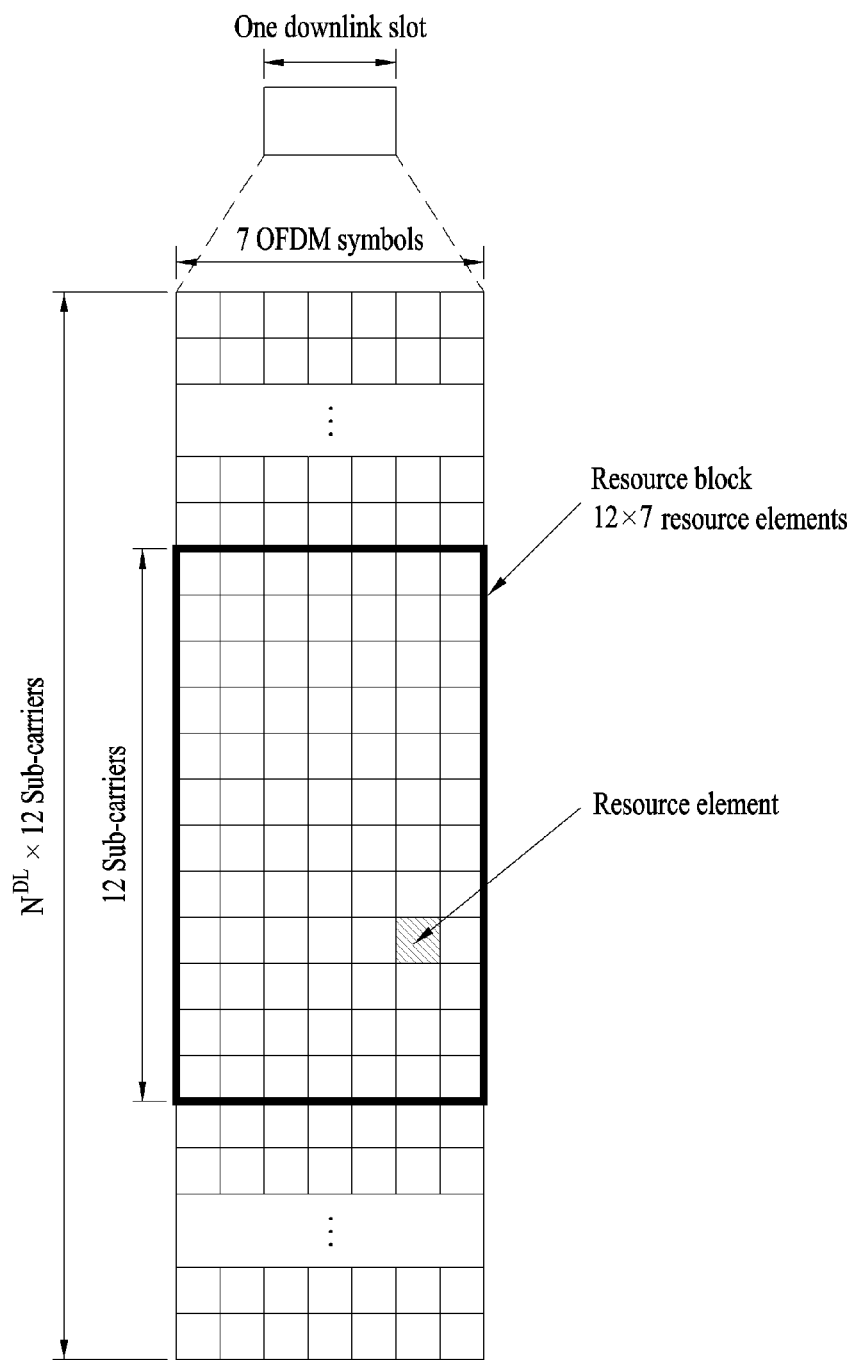
FIG. 4 is a diagram showing a resource grid of a downlink slot of a 3GPP LTE/LTE-A system which is an example of a wireless communication system.

FIG. 4 is a diagram showing a resource grid of a downlink slot of a 3GPP LTE/LTE-A system which is an example of a wireless communication system.

Referring to FIG. 4, a DL slot includes a plurality of OFDM symbols in the time domain. One DL slot includes 7 (or 6) OFDM symbols and an RB includes 12 subcarriers in the frequency domain. Each element of the resource grid is referred to as a Resource Element (RE). An RB includes 12×7(6) REs. The number NRB of RBs included in a DL slot depends on a DL transmission bandwidth. A UL slot may have the same structure as a DL slot, except that an OFDM symbol is replaced with an SC-FDMA symbol.

Figure 5:
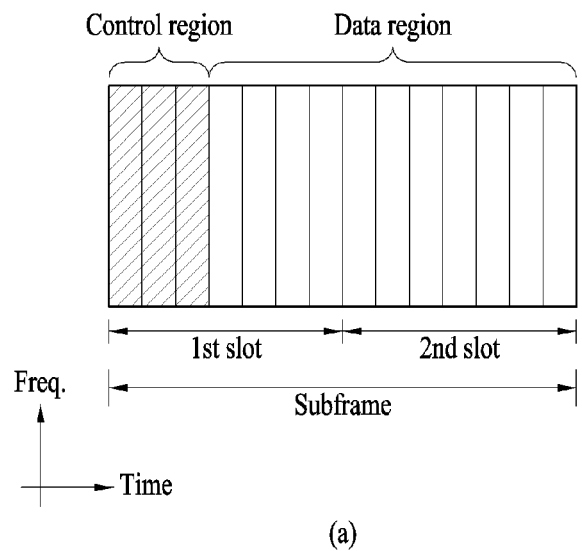
FIG. 5 is a diagram showing the structure of a downlink subframe used in a 3GPP LTE/LTE-A system which is an example of a wireless communication system.
Figure 5:
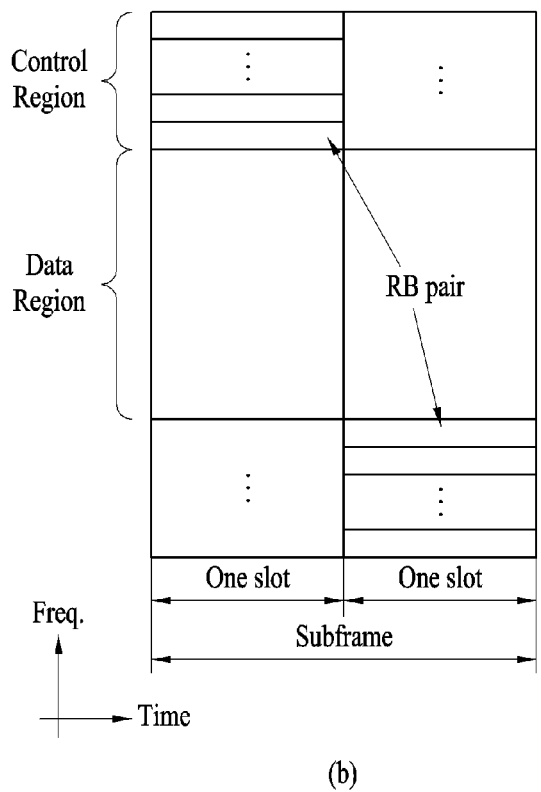

FIG. 5 is a diagram showing the structure of a downlink subframe used in a 3GPP LTE/LTE-A system which is an example of a wireless communication system.

Referring to FIG. 5, a maximum of three (four) OFDM symbols located in a front portion of a first slot within a subframe corresponds to the control region to which a control channel is allocated. The remaining OFDM symbols correspond to the data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted on a first OFDM symbol of a subframe and carries information regarding the number of OFDM symbols used for transmission of control channels within the subframe. The PHICH is a response to uplink transmission and carries a HARQ acknowledgment (ACK)/negative acknowledgment (NACK) signal.

Control information carried on the PDCCH is called downlink control information (DCI). As a DCI format, format 0 for uplink and formats 1, 1A, 1B, 1C, 1D, 2, 2A, 3 and 3A for downlink are defined. The DCI format selectively includes a hopping flag, RB allocation, modulation coding scheme (MCS), redundancy version (RV), new data indicator (NDI), transmit power control (TPC), cyclic shift demodulation reference signal (DMRS), channel quality information (CQI) request, HARQ process number, transmitted precoding matrix indicator (TPMI), precoding matrix indicator (PMI) confirmation, etc. according to usage thereof.

The PDCCH may deliver information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, a Tx power control command, Voice Over Internet Protocol (VoIP) activation indication information, etc. A plurality of PDCCHs may be transmitted in the control region. The UE may monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). The format of the PDCCH and the number of PDCCH bits are determined according to the number of CCEs. The base station determines a PDCCH format according to DCI to be transmitted to the UE and attaches cyclic redundancy check to control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by an ID (e.g. a cell-RNTI (C-RNTI)) of the UE. If the PDCCH carries a paging message, the CRC may be masked by a paging ID (e.g. a Paging-RNTI (P-RNTI)). If the PDCCH carries system information, particularly, a System Information Block (SIB), the CRC may be masked by a system information ID (e.g. a System Information RNTI (SI-RNTI)). If the PDCCH is for a random access response, the CRC may be masked by a Random Access-RNTI (RA-RNTI).

Figure 6:
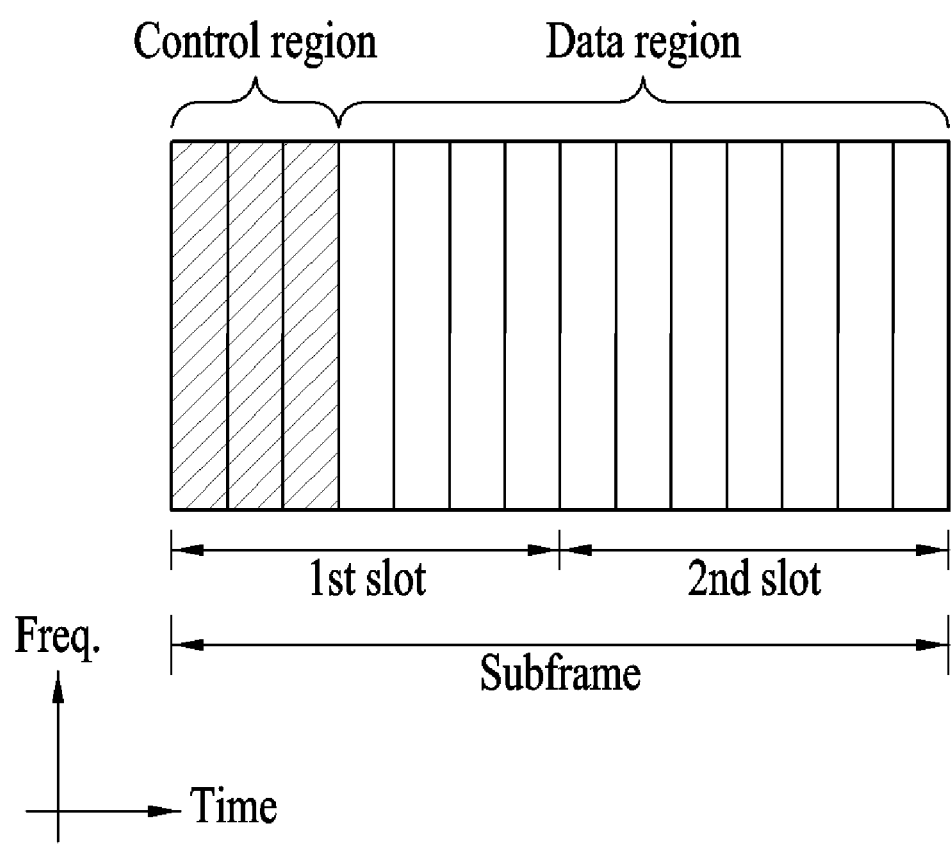
FIG. 6 is a diagram showing the structure of an uplink subframe used in a 3GPP LTE/LTE-A system which is an example of a wireless communication system.

FIG. 6 is a diagram showing the structure of an uplink subframe used in a 3GPP LTE/LTE-A system which is an example of a wireless communication system.

Referring to FIG. 6, the UL subframe includes a plurality (e.g., two) of slots. The slot may include SC-FDMA symbols, the number of which is changed according to CP length. The UL subframe is divided into a control region and a data region in the frequency domain. The data region includes a physical uplink shared channel (PUSCH) and is used to transmit a data signal such as voice. The control region includes a physical uplink control channel (PUCCH) and is used to transmit uplink control information (UCI). The PUCCH includes an RB pair located at both ends of the data region on the frequency axis and hops over a slot boundary.

The PUCCH can be used to transmit the following control information.

Scheduling Request (SR): This is information used to request a UL-SCH resource and is transmitted using an On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword (CW) and a 2-bit ACK/NACK signal is transmitted as a response to two downlink codewords.

Channel Quality Indicator (CQI): This is feedback information about a downlink channel Feedback information regarding MIMO includes a rank indicator (RI), a precoding matrix indicator (PMI), a precoding type indicator (PTI), etc. 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports seven formats according to information transmitted thereon.

Spectral efficiency of the FDR Tx/Rx system capable of simultaneously transmitting and receiving UL and DL signals on the same frequency band can be increased twice or less as compared to the legacy system for transmitting/receiving UL and DL signals through division of frequency or time, such that the FDR Tx/Rx system has been highlighted as a core technology of the next-generation 5G mobile communication system.

FDR based on a single frequency transmission band may be defined by a transmission resource configuration scheme capable of simultaneously performing transmission and reception through a single frequency transmission band from the viewpoint of an arbitrary wireless device. As a special example of the FDR, wireless communication between a general BS (or a repeater, a relay node, a remote radio head (RRH), etc.) and a UE can be represented as a Tx resource configuration scheme capable of simultaneously performing not only DL transmission and UL reception of the BS, but also DL reception and UL transmission of a UE through a single frequency Tx band. In another example, under D2D (Device-to-Device) direct communication between the UEs, such wireless communication may be represented as a Tx resource configuration scheme in which Tx and Rx operations between the UEs are simultaneously performed on the same frequency Tx band. Although the following description will disclose exemplary wireless Tx/Rx between a general BS and a UE indicating a wireless terminal and FDR associated technologies for convenience of description, the scope of the present invention may also be applied to a network UE capable of performing wireless Tx/Rx between a general BS and a UE, and may further include an example of D2D direct communication as necessary.

Figure 7:
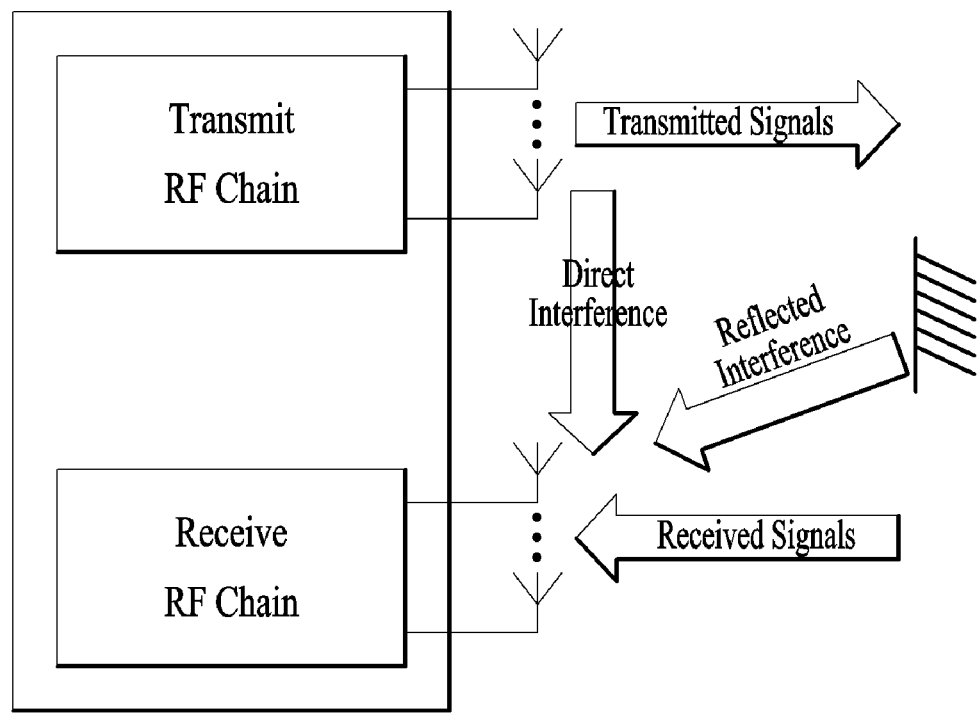
FIG. 7 is a diagram showing the concept of a transmission/reception link and self-interference (SI) in an FDR communication situation.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 7] below.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the

TABLE 7

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 7, it may be noted that to effectively operate the FDR system in a 20-MHz BW, a UE needs 119-dBm Self-IC performance. A thermal noise value may be changed to $N_{0,BW}$=−174 dBm+10×$\log_{10}$ (BW) according to the BW of a mobile communication system. In Table 7, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes.

Figure 8:
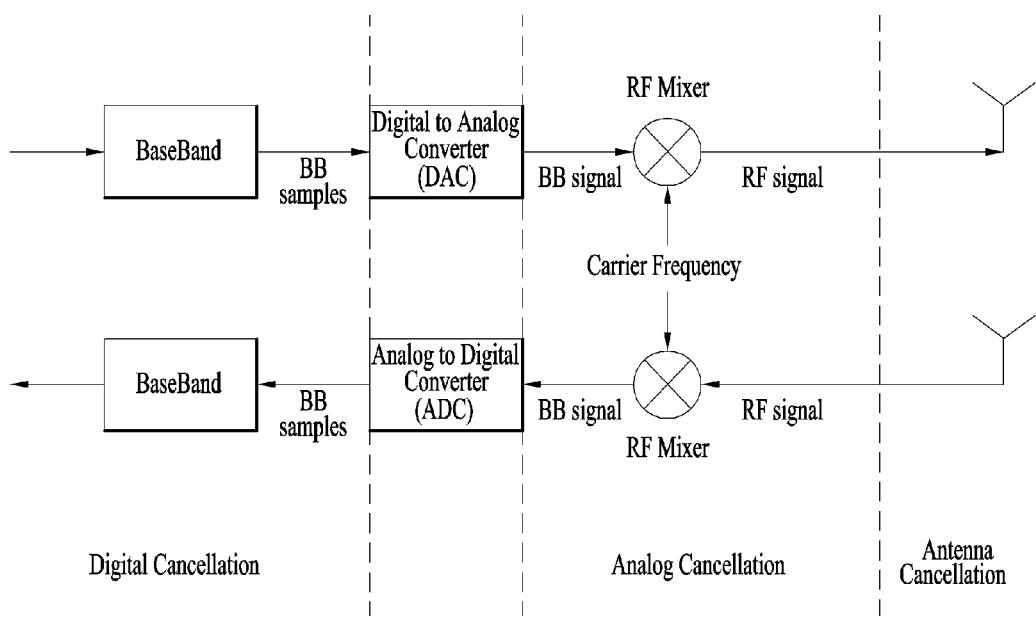
FIG. 8 is a view illustrating positions at which three Self-IC schemes are applied, in a Radio Frequency (RF) Tx and Rx end (or an RF front end) of an apparatus.

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

signal powers of a designed signal and an interference signal remaining after interference cancellation in one of the above-described techniques should fall into an ADC range, to perform digital Self-IC.

Figure 9:
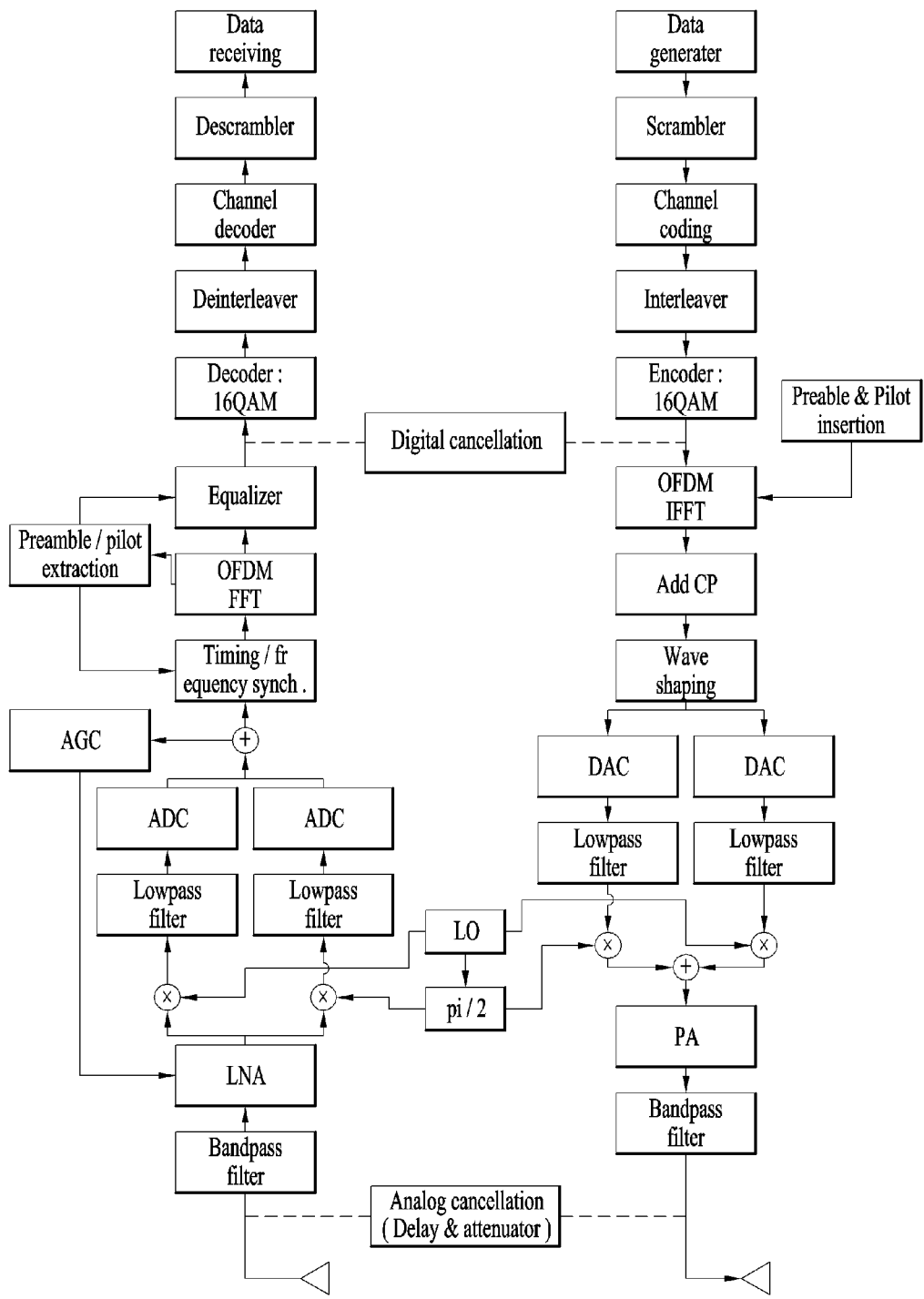
FIG. 9 is a block diagram of a Self-IC device in a proposed communication apparatus in an OFDM communication environment based on FIG. 8.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 5.

The 3GPP LTE system operates on the basis of fixed UL/DL bands where the duplex mode (TDD/FDD) is predetermined as shown in Table 8 below. In the TDD, a TDD configuration can be determined in a cell-specific manner, but in the FDD, determined UL/DL bands are located at different frequency bands. In addition, since it is regulated that one band should be used for either transmission at a UE or transmission at a BS, transmission may not be performed in the other band. Table 8 shows E-UTRA frequency bands.

TABLE 8

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 24 | 1626.5 MHz-1660.5 MHz | 1525 MHz-1559 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

Note
[1]Band 6 is not applicable.

However, in the real case, the UE has a data environment where data traffic is asymmetric, and in most communication environments, the amount of DL data traffic is higher than the amount of UL data traffic. In a certain report, a ratio of the amount of UL traffic to the amount of DL traffic was reported as about 1:9. In this asymmetric data traffic environment, if the system operates according to the FDD-LTE scheme, that is, based on the fixed frequency allocation for UL and DL transmission as shown in Table 8, the resource use efficiency may be degraded. To prevent this problem, a flexible FDD radio transmission is proposed at the initial stage of the FDR system.

Figure 10:
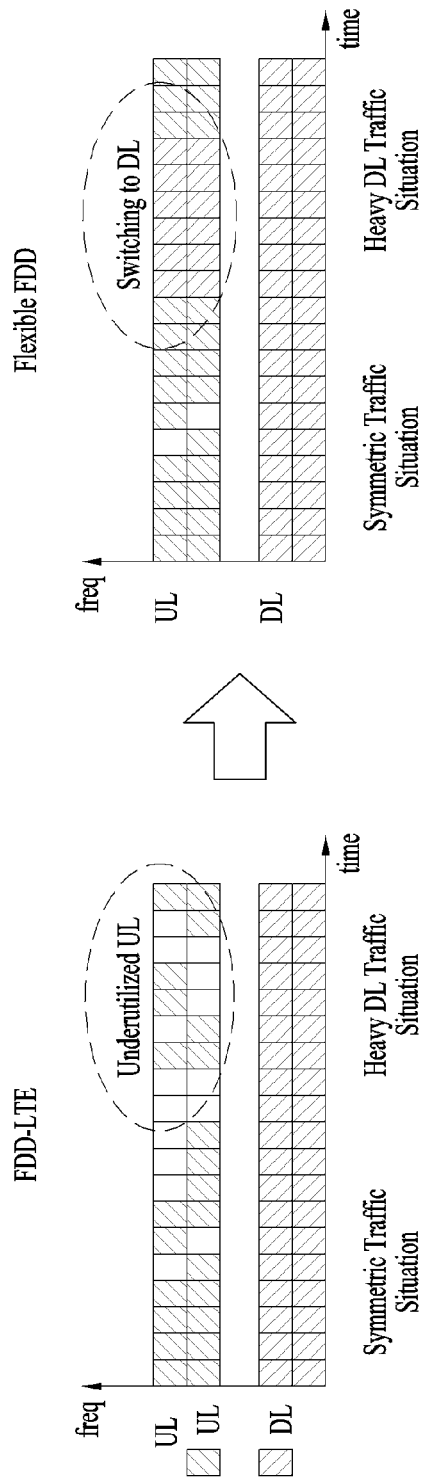
FIG. 10 is a diagram illustrating comparison of resource use efficiency between a conventional FDD-LTE radio transmission scheme and a flexible FDD radio transmission scheme.

The flexible FDD system is a technology for improving the resource use efficiency by utilizing a UL band as a DL band during a specific time according to a UE's traffic environment based on the fact that operation regulation imposed on the FDD system is released due to the actual asymmetric data traffic. In FIG. 10, the resource use efficiency between the conventional FDD-LTE radio transmission scheme and the flexible FDD radio transmission scheme is compared FIG. 10 is a diagram illustrating the comparison of the resource use efficiency between the conventional FDD-LTE radio transmission scheme and the flexible FDD radio transmission scheme (symmetric traffic situation and heavy DL data traffic situation).

Figure 11:
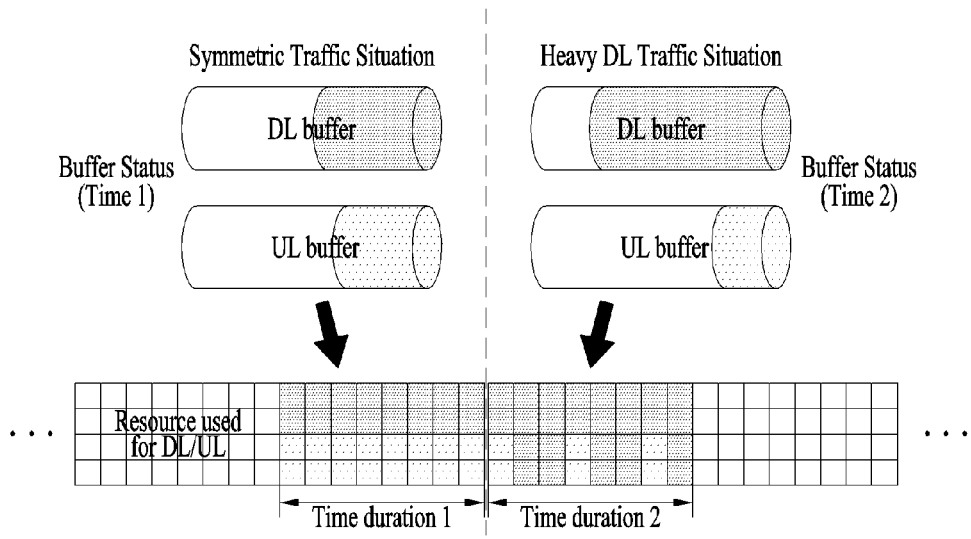
FIG. 11 is a diagram illustrating resource use according to a flexible FDD scheme.

As shown in FIG. 10, since most of the DL and UL resources are used in the symmetric data traffic situation, the resource efficiency is high. However, it can be seen from FIG. 10 that the FDD-LTE system rarely use resources in the heavy DL data traffic situation, frequency resources are wasted. To solve the problem of degrading the resource use efficiency, UL frequency resources can be utilized as frequency resources for DL transmission during a specific time, thereby improving the resource efficiency in the heavy DL data traffic situation. In FIG. 11, this is illustrated in detail together with a buffer status to be transmitted in the flexible FDD radio transmission scheme.

FIG. 11 is a diagram illustrating resource use according to flexible FDD scheme.

Referring to FIG. 11, it can be seen that if UL frequency resources are used as DL resources for DL transmission at a specific time, the resource use efficiency in the heavy DL traffic situation can be increased than that in the symmetric traffic situation.

The flexible FDD radio transmission scheme means a scheme for configuring DL frequency resources and UL frequency resource in a flexible manner according to individual services or application programs. In this case, a time resource may be configured on a time slot basis, a subframe basis, or a frame basis, each of which consists of at least one transmission symbols. According to the flexible FDD radio transmission scheme, it is possible to support allocation of radio transmission resources optimized to provide a service or an application program to each UE and at the same time, enhance the total frequency use efficiency in terms of coverage of an arbitrary BS.

Figure 12:
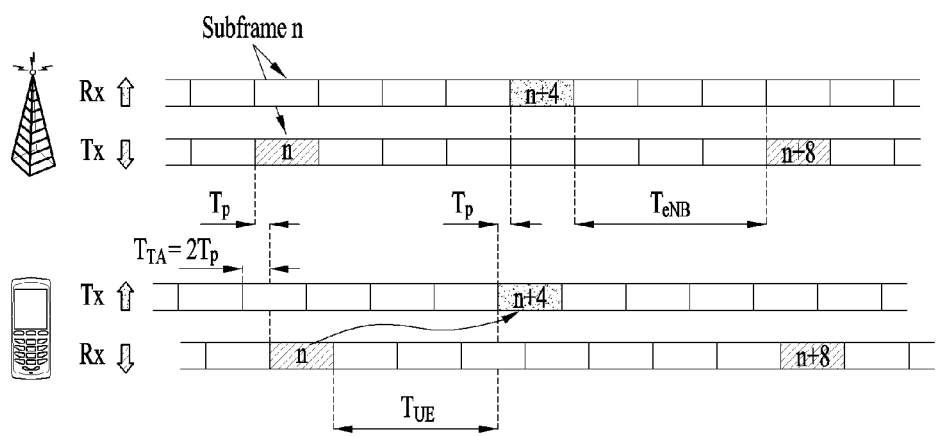
FIG. 12 is a diagram illustrating HARQ timing in an FDD-LTE system.

FIG. 12 is a diagram illustrating HARQ timing in the FDD-LTE system.

In the conventional FDD-LTE system, since DL and UL transmission is simultaneously performed (i.e., DL and UL transmission is performed on subframe n) and a delay caused when a control channel including HARQ feedback is transmitted is fixed to '4 processing delay', the HARQ feedback may be transmitted in subframe n+4, and retransmission due to NACK is performed after subframe n+8.

In the flexible FDD radio transmission scheme, since a UL band is used for DL transmission at a specific time, UL transmission may be impossible after the subframe n+4. Thus, it is apparent that the average delay caused by HARQ feedback timing and control channel transmission in the conventional FDD system becomes greater than 4 subframes. Thus, the HARQ feedback timing and the like needs to be modified.

The present invention proposes technologies for efficiently applying the flexible FDD radio transmission scheme to radio transmission between a BS and a UE. It is apparent that the term "base station" mentioned in this specification includes a relay node, remote radio head (RRH), etc. The present invention proposes not only a frame structure suitable for the flexible FDD radio transmission scheme but also HARQ feedback timing in accordance with the proposed frame structure.

The present invention proposes to use some or all of a UL band allocated by a system as a DL band according to scheduling from a BS in an FDD frame structure for the flexible FDD radio transmission scheme. To this end, an issue for using a part of the UL band allocated by the system for DL transmission at a specific time and configuring a guard band therefor within the UL band allocated by the system needs to be additionally included in the current 3GPP LTE/LTE-A standards. To implement the proposal, particular embodiments will be described in detail hereinafter.

Embodiment 1

In embodiment 1 of the present invention, to design a radio transmission frame resource structure dedicated to the flexible FDD radio transmission scheme, a UL band is divided into two or more bands and allocated as a combination of DL/UL/GB regions.

For the flexible FDD radio transmission scheme, all UL bands can be used for DL transmission. In this case, different from the conventional FDD-LTE radio transmission scheme where HARQ feedback can be transmitted after 4 subframes due to possible UL transmission, there may be a problem that timing of control channel information (including HARQ) for DL should be changed like a TDD-LTE radio transmission scheme. To solve this problem, the present invention proposes a method for holding some bands corresponding to existing UL PUSCH/PUCCH transmission for UL transmission and changing the remaining bands as DL transmissions for the flexible FDD radio transmission scheme.

In detail, a UL bandwidth is first divided into subbands. Then, UL transmission is performed on some subbands, and DL reception is performed on other subbands for flexible duplex. In addition, a guard band (GB) may be configured by considering out-of-band (OOB) interference between two subbands. In this case, to facilitate implementation, the length of the GB may be determined by considering the strength of interference between the neighboring subbands. Alternatively, the GB length may be determined by considering the interference strength of interference between the neighboring subbands after applying a technique for reducing the OOB interference (e.g., new waveform such as FBMC, GFDM, etc. or digital filtering at a baseband).

Figure 13:
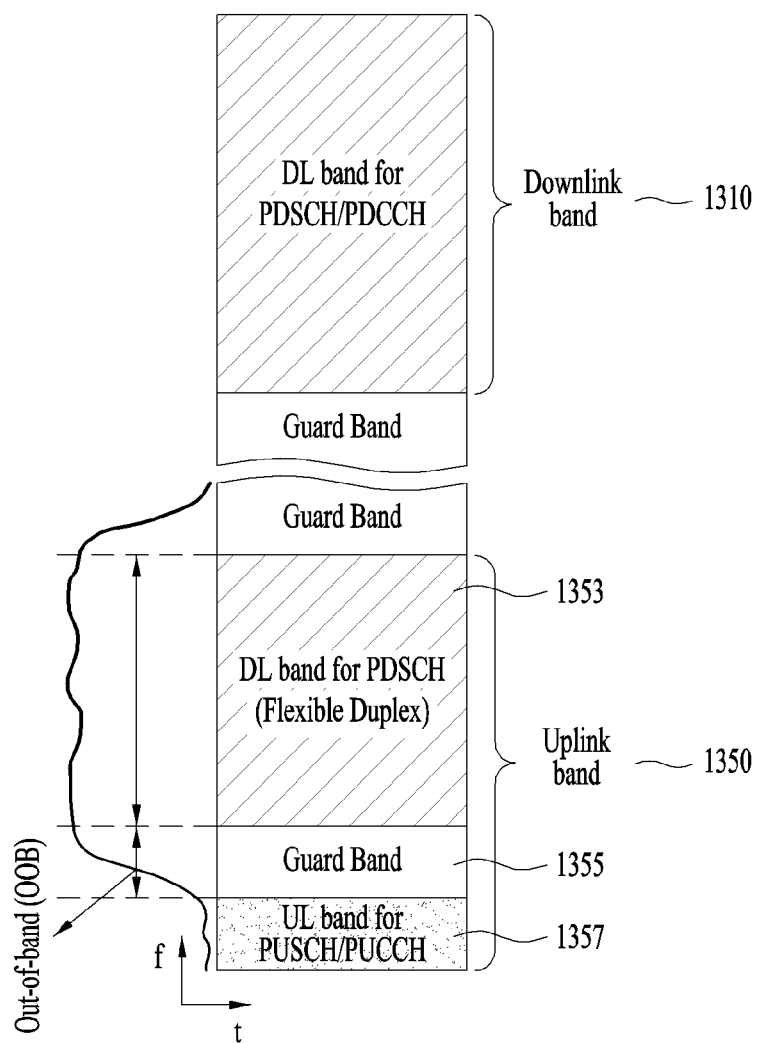
FIG. 13 illustrates an exemplary flexible FDD radio transmission scheme with a frame structure where a UL band allocated by a system is divided into three subbands in the following order: downlink band/guard band/uplink band (DL/GB/UL).

FIG. 13 illustrates an exemplary flexible FDD radio transmission scheme with a frame structure where a UL band allocated by a system is divided into three subbands in the following order: downlink band/guard band/uplink band (DL/GB/UL).

Referring to FIG. 13, an FDD frame may include a DL band 1310 and a UL band 1350 allocated by the system. In the case of a flexible FDD frame, a partial band of the UL band 1350 (specifically, a frequency band adjacent to the DL band) is switched to a DL band for flexible duplex 1353 as shown in FIG. 13, and thus a UE can perform DL reception on the DL band 1353. A partial band of the UL band 1350 (specifically, a frequency band farthest away from the DL band 1350) is set as a UL band 1357, and control information may be transmitted thereon. In FIG. 13, the band 1357 is illustrated as a UL band for PUCCH and/or a PUSCH, i.e., for carrying control information.

In this case, since UL transmission and DL reception is simultaneously performed on adjacent bands, the OOB occurs in the UL band 1350 as described above. To prevent the occurrence of the OOB, a GB 1355 is configured between the band for UL transmission and the band for DL reception within the UL band 1350. The order of bands can be changed, which is different from the order of FIG. 13 (e.g., UL/GB/DL), or a different combination can be used. In addition, in FIG. 13, the OOB occurring from the DL band 1353 to the UL band 1357 within the UL band 1350 is from the perspective of a BS.

Embodiment 2

In embodiment 2 of the present invention, if an entire UL band is used as a DL band to design the radio transmission frame resource structure dedicated to the flexible FDD radio transmission scheme, a guard time (GT) can be configured for next UL transmission.

In the case of the TDD-LTE radio transmission scheme, a special subframe is present between DL and UL subframes due to signal transmission propagation characteristics, unlike the FDD-LTE radio transmission scheme. In the special subframe, a guard time needs to be equal to or greater than a round trip delay of a link to prevent transmission and reception intervals from overlapping due to application of a timing advanced mechanism for radio interval propagation delay and UL reception synchronization in switching from a DL subframe to a UL subframe on the corresponding link between a BS and a UE. To support it, the special subframe is defined, which consists of a DL transmission symbol, a GT symbol, and a UL transmission symbol.

For the flexible FDD radio transmission scheme, when DL transmission is performed using a UL band at a specific time, it is necessary to set a guard time to be equal to or greater than a round trip delay of a corresponding link to perform UL transmission on a next UL band like the conventional TDD-LTE system.

Embodiment 2-1

Figure 14:
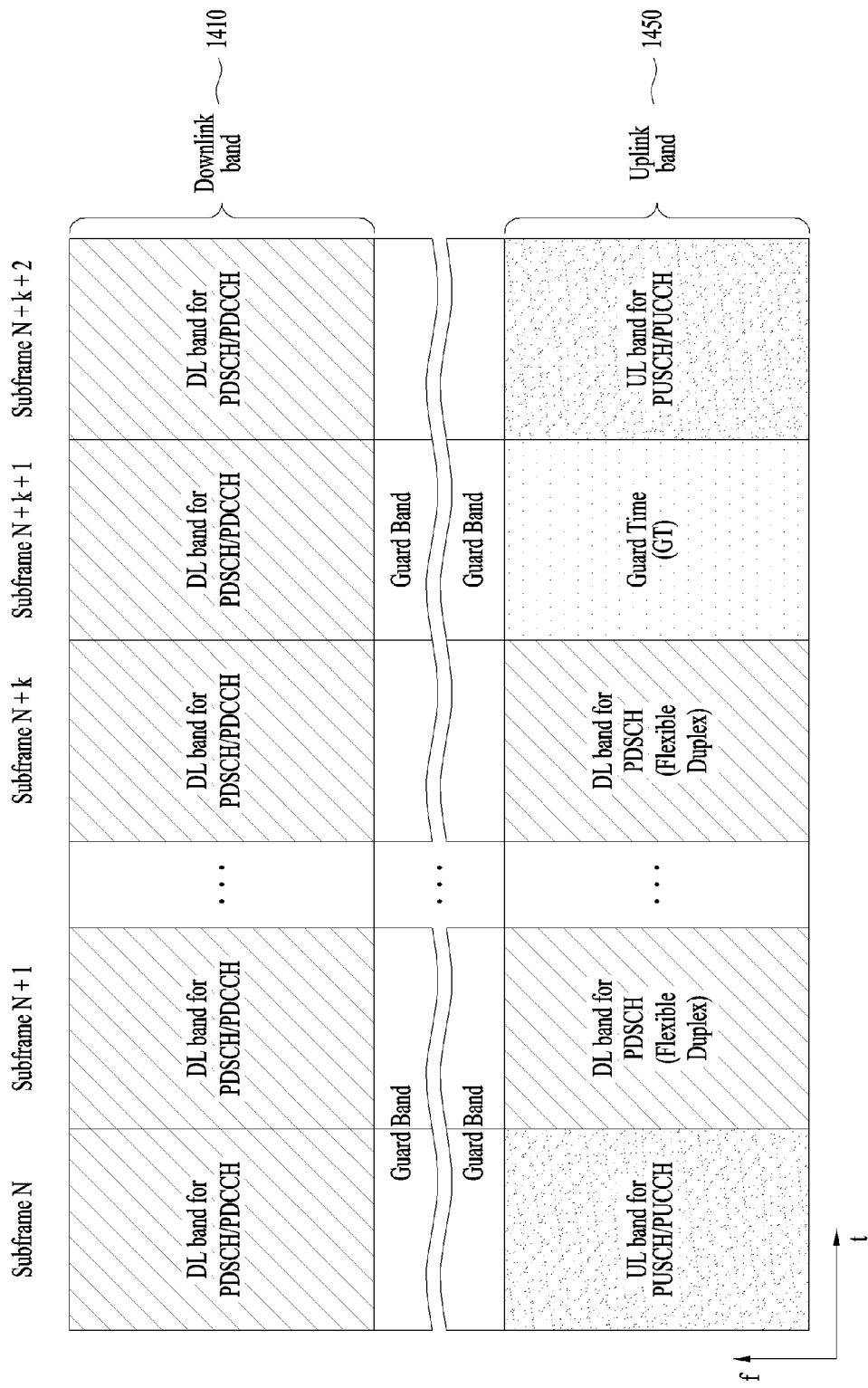
FIG. 14 is a diagram illustrating an exemplary method for setting three consecutive UL subframes in the following order: DL/GT/UL.

FIG. 14 is a diagram illustrating an exemplary method for setting three consecutive UL subframes in the following order: DL/GT/UL.

In a sub-embodiment of embodiment 2-1, as shown in FIG. 14, in an entire UL band 1450, a specific time interval (for example, from subframe N+1 to subframe N+k for transmission during k subframes may be set as a DL band for DL transmission. In addition, subframe N+k+1 may be set as a guard time (GT).

Embodiment 2-2

Figure 15:
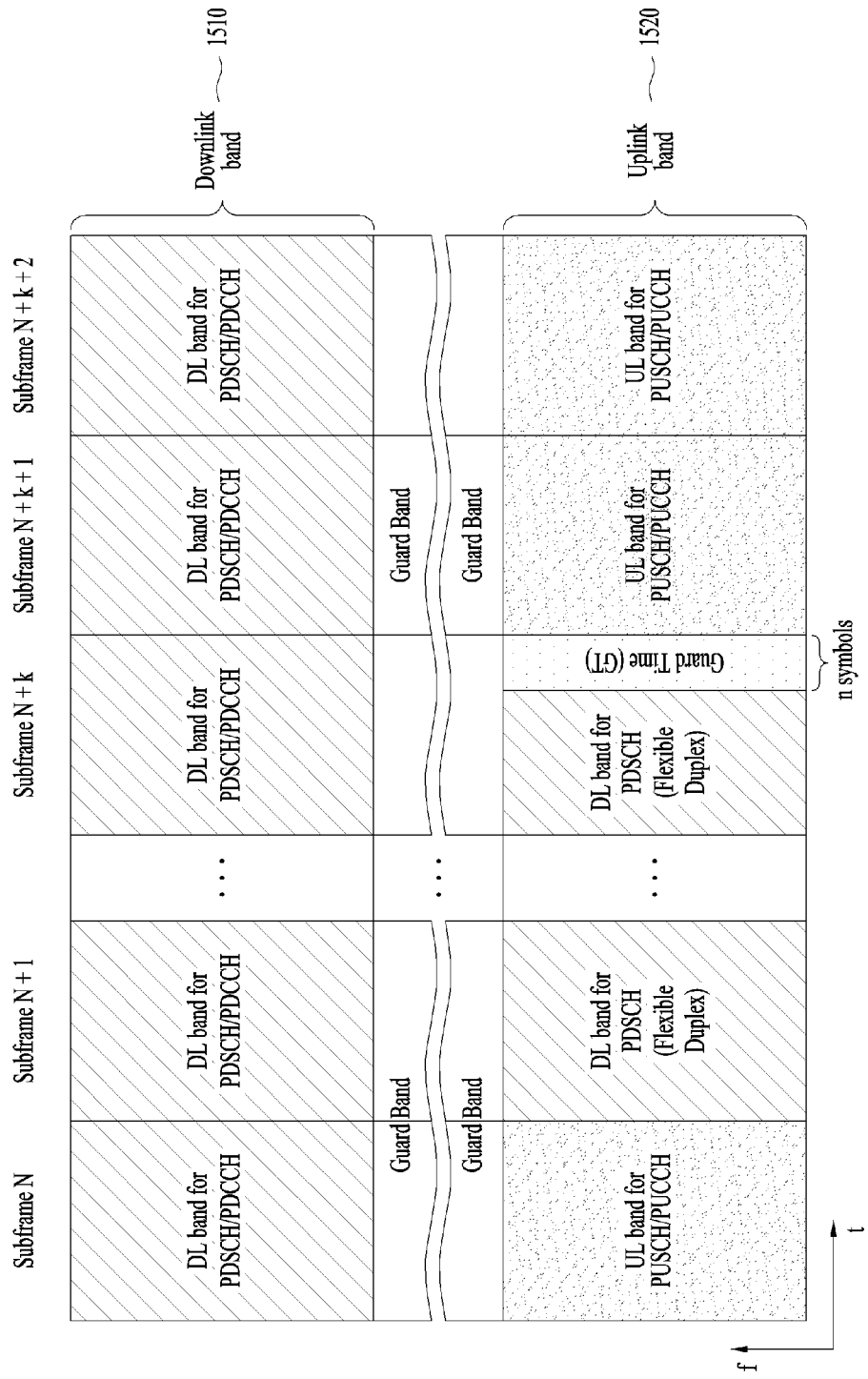
FIG. 15 is a diagram illustrating an exemplary method for setting two consecutive UL subframes in the following order: DL/GT/UL.

FIG. 15 is a diagram illustrating an exemplary method for setting two consecutive UL subframes in the following order: DL/GT/UL.

Referring to FIG. 15, to prevent frequency efficiency degradation caused by installation of a guard time, some last symbols of the last DL subframe (subframe N+k in FIG. 15) transmitted in a UL band 1520 may set as a guard time. Here, the number of symbols set as the guard time is equal to or greater than 1, and it can be increased up to the number of symbols included in a subframe (for example, in the LTE system, a subframe includes 14 symbols).

Embodiment 3

In embodiment 3 of the present invention, the last symbol of a UL band can be allocated for sound reference signal (SRS) transmission to design the radio transmission frame resource structure dedicated to the flexible FDD radio transmission scheme. To support backward compatibility with the conventional FDD-TDD radio transmission scheme, SRS transmission according to specific SRS scheduling may be required. To this end, in the frame structure proposed in embodiment 1 or 2, the last symbol of the UL band may be allocated for the SRS transmission.

FIGS. 16a and 16b are diagrams respectively illustrating examples in which the last UL symbol is allocated for SRS transmission according to embodiments 1 and 2.

Specifically, FIGS. 16a and 16b respectively show that the last UL symbol is allocated for the SRS transmission according to embodiments 1 and 2 and a guard time is configured to prevent transmission and reception intervals for the SRS transmission and DL reception from overlapping with each other. In addition, similar to SRS transmission in the 3GPP LTE/LTE-A system, bands for PUCCH transmission at both ends of an SRS transmission symbol may be set as guard bands or used for the PUCCH transmission depending on situations.

Embodiment 4

In embodiment 4 of the present invention, a method for designing HARQ feedback timing in accordance with the radio transmission frame structure dedicated to the flexible FDD radio transmission scheme is proposed.

To implement the flexible FDD radio transmission scheme where PUCCH transmission is impossible at a specific time because some or all of the UL band is used as the DL band as described in embodiment 2 or 3, HARQ timing transmission with the same concept as in the TDD-LTE system should be defined. In the conventional TDD-LTE system, since a UL/DL configuration is predetermined, an interval for ACK/NACK transmission is fixed as well. However, in the flexible FDD system according to embodiment 4, since resources for PUCCH transmission may not be allocated at a specific time, an ACK/NACK transmission time (e.g., a subframe for carrying ACK/NACK) needs to be designated according to a DL/UL ratio at a specific transmission time. Although it is described in embodiment 4 that a physical HARQ indicator channel (PHICH) and a physical uplink control channel (PUCCH) are used for the ACK/NACK transmission, other physical channels (e.g., enhanced-PHICH (E-PHICH), physical downlink shared channel (PDSCH), physical uplink shared channel (PUSCH), etc.) may be used for the transmission.

To achieve radio transmission between a BS and a UE based on the frame structure for the proposed flexible 1-DD radio transmission scheme, a PUCCH transmission time needs to be configured to transmit ACK/NACK in response to a PDCCH for scheduling a PDSCH or PUSCH. The following methods may be used to configure the PUCCH transmission time.

The UE transmits the PUCCH in a UL subframe that is separated by a minimum of 4 ms from but closest to the time at which the PDCCH for scheduling the PDSCH or PUSCH is transmitted.

PUCCHs transmitted in individual UL subframes can be uniformly distributed according to the following standards so that a bundling window size (M) does not have a large value in a specific subframe.

When (the number of DL subframes)/(the number of UL subframes) is less than 2, the PUCCH transmission time for one PDSCH or a PDCCH for scheduling the PDSCH is set for a UL subframe. Thereafter, the PUCCH transmission for a next PDSCH or a PDCCH for scheduling the next PDSCH is performed using a next UL subframe. In addition, if the PUCCH transmission time is set for all the UL subframes, a PUCCH for a next PDSCH or a PDCCH for scheduling the next PDSCH is transmitted using a next UL subframe.

When (the number of DL subframes)/(the number of UL subframes) is equal to or greater than 2, the PUCCH transmission time is set such that the value of M in one UL subframe becomes 2. Thereafter, the PUCCH transmission for a next PDSCH or a PDCCH for scheduling the next PDSCH is set such that the value of M in a next UL subframe becomes 2. In addition, if the PUCCH transmission time is set for all the UL subframes, a PUCCH for a next PDSCH or a PDCCH for scheduling the next PDSCH is transmitted using a next UL subframe.

Hereinafter, a description will be given of a PUCCH transmission timing configuration for ACK/NACK transmission with reference to the design of the PUCCH transmission time for the ACK/NACK transmission.

For convenience of description, it is assumed that HARQ timing is changed according to the number of times of continuous DL transmission from a UL band for flexible duplex transmission on the basis of 10 subframes as in the TDD system. In addition, it is assumed that there is no DL transmission during 4 subframes after continuous UL transmission is performed on 10 consecutive subframes. If DL transmission occurs due to use of a UL band within the 4 subframes after the continuous UL transmission is performed, the embodiment can be modified as follows according to the above-described design rule.

Embodiment 4-1

If a guard time corresponding to one subframe is configured between DL transmission and UL transmission (as in embodiment 2-1), HARQ timing can be set as shown in Table 9 (Downlink association set index K: $\{k_0, k_1, \ldots, k_{M-1}\}$ in Table 9).

TABLE 9

| The number of times of continuous DL transmission from an uplink band, subframe | subframe number N + 1 + i | | | | | | | | | |
|---|---|---|---|---|---|---|---|---|---|---|
| N + 1 | 0 | 1 | 2 | 3 | 4 | 5 | 6 | 7 | 8 | 9 |
| 1 | | | 6,5 | 5,4 | 4 | 4 | 4 | 4 | 4 | 4 |
| 2 | | | | 7,6 | 6,5 | 5,4 | 4 | 4 | 4 | 4 |
| 3 | | | | | 8,7 | 7,6 | 6,5 | 5,4 | 4 | 4 |
| 4 | | | | | | 9,8 | 8,7 | 7,6 | 6,5 | 5,4 |
| 5 | | | | | | | 10,9 | 9,8 | 8,7 | 7,6,5,4 |

Embodiment 4-2

If a guard time corresponding to a symbol interval shorter than the length of one subframe is configured between DL transmission and UL transmission (as in embodiment 2-2), HARQ timing can be set as shown in Table 10 (Downlink association set index K: $\{k_0, k_1, \ldots, k_{M-1}\}$ in Table 10).

TABLE 10

| The number of times of continuous DL transmission from an uplink band, subframe | subframe number N + 1 + i | | | | | | | | | |
|---|---|---|---|---|---|---|---|---|---|---|
| N + 1 | 0 | 1 | 2 | 3 | 4 | 5 | 6 | 7 | 8 | 9 |
| 1 | | 5,4 | 4 | 4 | 4 | 4 | 4 | 4 | 4 | 4 |
| 2 | | | 6,5 | 5,4 | 4 | 4 | 4 | 4 | 4 | 4 |
| 3 | | | | 7,6 | 6,5 | 5,4 | 4 | 4 | 4 | 4 |
| 4 | | | | | 8,7 | 7,6 | 6,5 | 5,4 | 4 | 4 |
| 5 | | | | | | 9,8 | 8,7 | 7,6 | 6,5 | 5,4 |

The aforementioned embodiments are achieved by combination of structural elements and features of the present invention in a predetermined manner Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method performed by a user equipment for performing communication using a flexible FDD frame in a wireless communication system can be industrially applied to various wireless communication systems such as the 3GPP LTE/LTE-A system, 5G system, and the like.

What is claimed is:

1. A method for performing communication using a flexible frequency division duplex (FDD) scheme by a user equipment (UE) in a wireless communication system, the method comprising:
    transceiving signals using the flexible FDD scheme,
    wherein a flexible FDD resource includes a downlink frequency band allocated for downlink, a guard band and an uplink frequency band allocated for uplink, wherein the guard band is configured between the downlink frequency band and the uplink frequency band in a frequency axis, and
    wherein a partial frequency band of the uplink frequency band is switched to a downlink frequency subband for downlink in a specific subframe for the flexible FDD scheme, wherein a guard subband is configured between the downlink frequency subband and an uplink frequency subband in the frequency axis, and the uplink frequency subband is included in the uplink frequency band,
    wherein the guard subband is configured based on out-of-band interference between the downlink frequency subband and the uplink frequency subband.

2. The method of claim 1, wherein the downlink frequency subband includes at least one downlink subframe for a downlink transmission, at least one uplink subframe for an uplink transmission, and a guard time configured between the at least one downlink subframe and the at least one uplink subframe in a time axis.

3. The method of claim 2, wherein the at least one uplink subframe includes a resource for transmitting a sounding reference signal (SRS).

4. The method of claim 2, further comprising:
    transmitting a hybrid automatic repeat request (HARQ)-acknowledgment (ACK) in the uplink frequency subband.

5. The method of claim 4, wherein the HARQ-ACK is transmitted in more than 4 ms after a corresponding PDSCH is received.

6. The method of claim 5, wherein the HARQ-ACK is transmitted at a specific subframe determined based on a ratio of a number of downlink subframes for downlink to a number of uplink subframes for uplink.

7. The method of claim 1, further comprising:
    receiving downlink signals on a physical downlink shared channel (PDSCH) and a physical downlink control channel (PDCCH) in the downlink frequency band and the downlink frequency subband; and
    transmitting uplink signals on a physical uplink control channel (PUCCH) or a physical uplink shared channel (PUSCH) in the uplink frequency subband.

8. A user equipment (UE) for performing communication using a flexible frequency division duplex (FDD) scheme in a wireless communication system, the UE comprising:
    a radio frequency (RF) unit; and
    a processor configured to control the RF unit to transceive a signal using the flexible FDD scheme,
    wherein a flexible FDD resource includes a downlink frequency band allocated for downlink, a guard band and an uplink frequency band allocated for uplink, wherein the guard band is configured between the downlink frequency band and the uplink frequency band in a frequency axis, and
    wherein a partial frequency band of the uplink frequency band is switched to a downlink frequency subband for downlink in a specific subframe for a flexible FDD scheme, wherein the guard subband is configured between the downlink frequency subband and an uplink frequency subband in the frequency axis, and the uplink frequency subband is included in the uplink frequency band,
    wherein the guard subband is configured based on out-of-band interference between the downlink frequency subband and the uplink frequency subband.

9. The UE of claim 8, wherein the downlink frequency subband includes at least one downlink subframe for a downlink transmission, at least one uplink subframe for an uplink transmission, and a guard time configured between the at least one downlink subframe and the at least one uplink subframe in a time axis.

10. The UE of claim 9, wherein the at least one uplink subframe includes a resource for transmitting a sounding reference signal (SRS).

11. The UE of claim 9, wherein the processor is further configured to control the RF unit to:
    transmit a hybrid automatic repeat request (HARQ)-acknowledgment (ACK) in the uplink frequency subband.

12. The UE of claim 11, wherein the HARQ-ACK is transmitted in more than 4 ms after a corresponding PDSCH is received.

13. The UE of claim 12, wherein the HARQ-ACK is transmitted at a specific subframe determined based on a ratio of a number of downlink subframes for downlink to a number of uplink subframes for uplink.

14. The UE of claim 8, wherein the processor is further configured to control the RF unit to:
    receive downlink signals on a physical downlink shared channel (PDSCH) and a physical downlink control channel (PDCCH) in the downlink frequency band and the downlink frequency subband; and
    transmit uplink signals on a physical uplink control channel (PUCCH) or a physical uplink shared channel (PUSCH) in the uplink frequency subband.

* * * * *